United States Patent [19]

Masihy et al.

[11] Patent Number: 4,676,900
[45] Date of Patent: Jun. 30, 1987

[54] WATER TRAP SYSTEM FOR RECOVERING PRECIOUS METALS

[76] Inventors: Jorge Masihy, 11030 SW. 163 St., Miami, Fla. 33157; Jose Navarrete, 6541 SW. 112 Ave., Miami, Fla. 33173

[21] Appl. No.: 658,825

[22] Filed: Oct. 9, 1984

[51] Int. Cl.⁴ .................... B01D 21/00; B01D 23/26; B01D 33/38
[52] U.S. Cl. ................................. 210/307; 210/525; 210/532.2
[58] Field of Search ................... 210/532.2, 513, 525, 210/515, 258, 416.1, 306, 307, 299

[56] References Cited
U.S. PATENT DOCUMENTS
4,439,323 3/1984 Ball ........................... 210/608

Primary Examiner—Andrew H. Metz
Assistant Examiner—Sharon T. Cohen
Attorney, Agent, or Firm—Malin, Haley & McHale

[57] ABSTRACT

Disclosed is an apparatus for recovering solid particulates in liquid, typically water containing precious metal particles, such as is produced as a by-product of jewelry manufacture. The apparatus has a settling tank, which contains a fabric trap for entrapping very fine particles. Water in the tank is moved through the trap by a syphon producing a very small pressure gradient across the trap, which, because the pressure is so small, enables one to use a trapping fabric of much larger mesh than has been possible heretofore.

7 Claims, 2 Drawing Figures

WATER TRAP SYSTEM FOR RECOVERING PRECIOUS METALS

BACKGROUND OF THE INVENTION

This invention pertains to the recovery of fine particulate matter from liquids, especially precious metals from water.

One by product of jewelry fabrication is water containing flakes of precious metals. Recovery of these flakes has obvious economic advantages. Heretofore, such particulates have been recovered by using a plurality of settling tanks. However, very fine particulates float on the water, resulting in the loss of considerable metal by this process. There have been some attempts to filter these fine particulates, such as pumping water across fine mesh filters. Unfortunately, if the pumping pressure is very high the particulates tend to be forced through the filter, necessitating that an effective system use a mesh sized approximately that of the particles themselves. Such filters would have a mesh size of approximately 1 micron, for too small to permit a flow rate across the filter sufficiently large to make the filtering system commercially viable. Accordingly, it would be advantageous to have an efficient system for extricating these fine particulates at a rate sufficiently high to be commercially viable.

SUMMARY OF THE INVENTION

Accordingly, it is an object of this invention to provide such a system for recovering recious metal that is sufficiently efficent, and operates at a sufficient capacity, to be commercially viable.

It is a further object of this invention to provide such an apparatus that operates under gravity flow, thus being very economical to operate.

It is a further object of this invention to provide such an apparatus that is mechanically simple and reliable, having no moving parts.

In accordance with these and other objects that shall become apparent hereinafter, there is disclosed an apparatus having a settling tank, and a trap located in the tank to remove particulates too fine to settle to the tank bottom. The trap has a syphon that sucks water from the tank, across the trap where the particles are removed, and out of the tank. The syphon has a suction vent that closes only when water in the tank reaches a height sufficient to ensure that the trap is fully exposed to water in the settling tank. Because a syphon is used, the pressure generated across the trap is very small, and is insufficient to force trapped particulates out of the trap. This enables one to use a much coarser mesh size.

The instant invention will be more fully understood from the following detailed description, it being understood, however, that the invention is capable of extended application, and is not confined to the precise disclosure. Changes and modifications may be made that do not affect the spirit of the invention, nor exceed the thereof. Accordingly, the instant invention will now be described with reference to the accompanying drawings.

DETAILED DESCRIPTION OF THE PREFERRED EMBODIMENT

Figure 1:
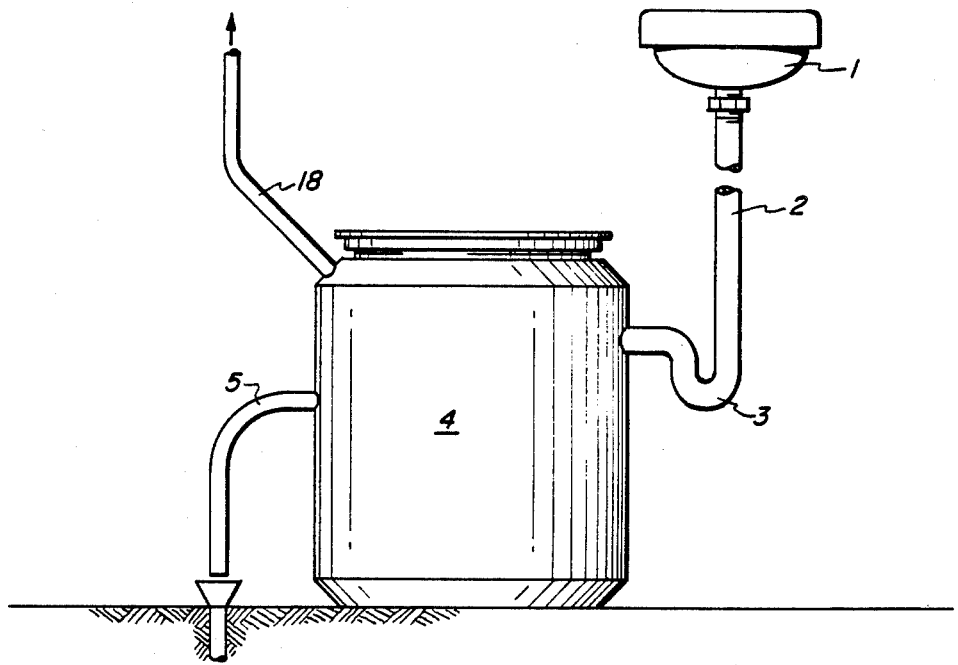
FIG. 1 is an elevational view of an apparatus embodying the instant invention.
Figure 2:
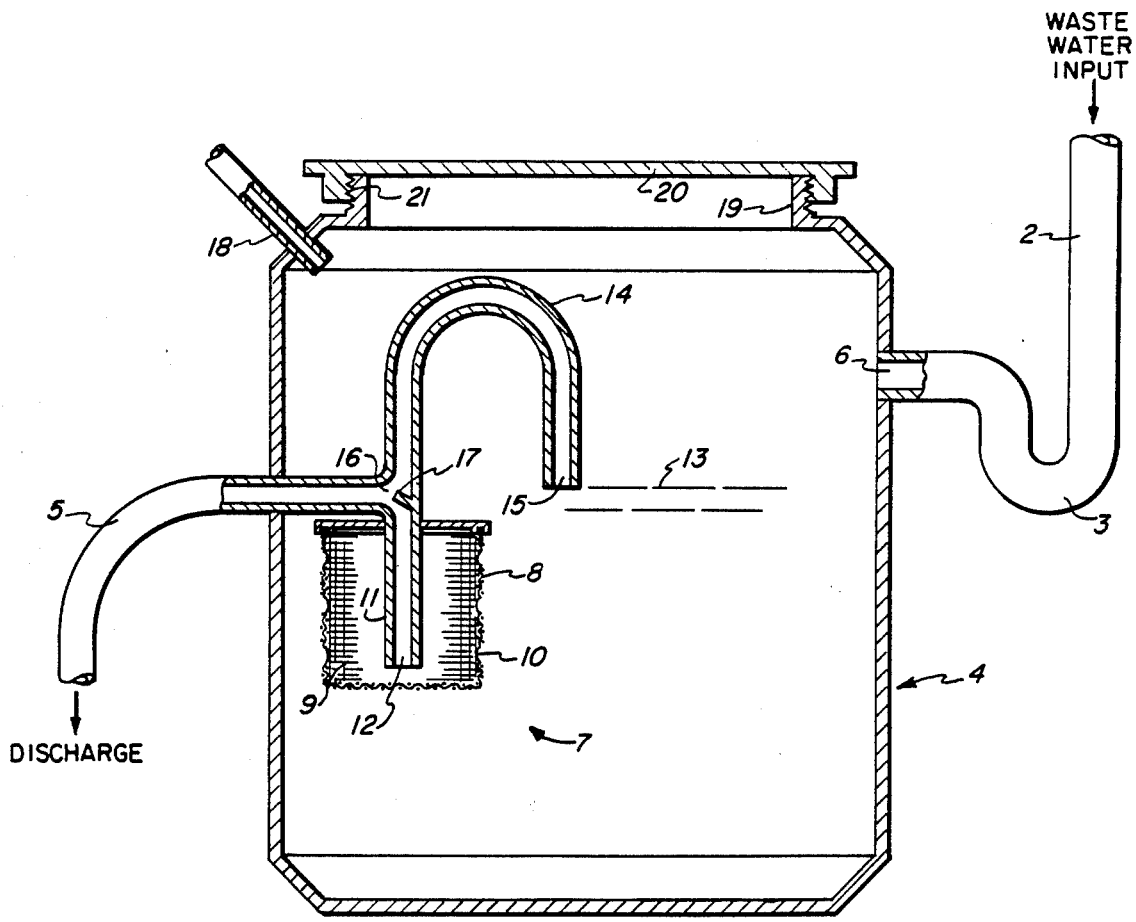
FIG. 2 is a sectional view of the apparatus in the direction of lines 2—2 of FIG. 1.

With particular reference to the drawing figures, there is shown a tank 4 having drain lines 2 receiving waste water containing particulate matter collected in receptacle 1. For convenience, tank 4 has a removable top 20 attached to neck 19 by screw threads 21. Vent (standpipe) 18 provides pressure communication between the inside and outside of tank 4. Water in receptacle 1 flows through pipe 2 into tank 4 at opening 6. Especially large particulate matter is removed from the water flow by p-trap 3.

Vertically mounted within tank 4 is a trapping means, shown generally at 7, for removing solid particulates that are so fine that they would float on the surface of water in tank 4. Trapping means 7 is constituted in a fabric mesh 9 enclosed by conventional casing 8 having a plurality of perforate openings 10 to enable contact between water in tank 4 and mesh 9. Disposed within mesh 9 is on arm 11 of a pipe having arms 5, 11 and 14, radiating from junction 16. Also loacted at junction 16 is flow restriction 17, here shown as a preferred cantilevered baffle depending from the of junction 16, that operates to hinder fluid flow from arm 11 to arm 5. Arms 5 and 11 constitute a syphon line, 11 being the suction end and 5 being the discharge end. Arm 14 is in the form of an inverted U, the prongs of which open at 16(i.e. to junction 16) and 15 (to the interior of tank 4). The bend of arm 14 mediate the prongs is disposed at the highest elevation of any portion of arm 14.

In operation, as water accumulates at the bottom of tank 4, the water level rises towards trapping means 7, and heavier than water particulates settle to the bottom of tank 4. In due course, the water level in tank 4, rises to cover mesh 9 and fills pipe arm 11. When the waterr level reaches that of arm 5, water begins to overflow into arm 5. As the water further rises, it reaches level 13 and closes off syphon vent 15 of arm 14. Arm 14 functions as a syphon vent to prevent syphoning through members 5 and 11 until the water level in tank 4 blocks opening 15. Upon blockage of opening 15, the water already overflowing in arm 5 causes arms 5, 11 to begin functioning as a syphon, sucking water accumulated in tank 4 through perforate openings 10, through mesh 9, into pipe arm 11 and ultimately into pipe arm 5 for discharge from the system. The orifice at 17 operates to limit the flow rate through arms 5, 11 so that fluid flow does not become so large as to break suction in the syphon. The dimensions of the tank, trap, etc., are selected so that normally, the water moving out of tank 4 by syphon 5, 11 is sufficient to maintain the water level in tank 4 below the apex of syphon vent 14. If however the level of water were to rise above this apex, member 14 would also begin to syphon water and discharge it through arm 5. In this manner, water in tank 4 is continuously syphoned across trap mesh 9 so as to trap very fine particulates floating on the surface of water in tank 4.

Trap mesh 9 is preferrably a random weave fabric having a mesh porosity on the order of 100 microns. Particulates floating on the surface of water in tank 4 would typically have diameters of about one micron. Because the mesh size of fabric 9 is so much larger than the diameter of these particulates, mesh 9 obviously cannot filter these particles. However, this porosity of mesh 9 is quite effective to entrap these particles, that is entwine the particles on fibers as the particles traverse the circuitous path amongst the various fibers of mesh 9. This would be impossible if the pressure gradient across mesh 9 were any but the gentle gradient generated by a syphon such as 5, 11. The gradient is preferably less than 5 psi, which is about the pressure drop across a ten foot water head. Even a small commercial pump would force the small particulates through mesh 9, rendering the trap ineffective. The mesh fibers could be of nylon polyester. The trapped particulates can be recovered in any conventional manner, for example burning mesh 9.

The foregoing description references the use of the instant invention in the jewelry fabrication industry. This is done for purposes of illustration rather than limitation. More generally, the instant invention has been shown and described herein in what is considered to be the most practical and preferred embodiment. It is recognized, however, that departures may be made therefrom within the scope of the invention, and that obvious modifications may occur to a person skilled in the art. Accordingly, the scope of the instant invention is to be determined solely by reference to the appended claims.

What is claimed is:

1. An apparatus for recoverring solid particulates from a liquid, said apparatus comprising:
   a setting tank having a chamber therein;
   an input port means communicating with the interior of said camber for enabling said liquid to flow into said tank;
   a foraminous receptacle defining trap means disposed within said chamber and positioned completely below said input port means for trapping said particulates from said incoming liquid, said foraminous receptacle comprising a mesh means for trapping said particulates, said foraminous receptacle being encased within perforate casing;
   a tubular means for causing said liquid to flow out of said tank, said tubular means for causing comprising a syphon means having tubular portions disposed within and without said receptacle for sucking said liquid through said trap means for effecting trapping of said particulates from said liquid within said foraminous receptacle;
   said syphon means comprising a suction conduit and a discharge conduit, said suction conduit being disposed within the interior of said receptacle, said discharge conduit communicting with the exterior of said tank and being effective to discharge liquid from said receptacle;
   said syphon means comprising an anti-syphon tubular vent and being so constructed to suck said liquid through said foraminous receptacle only when water in said collecting tank accumulates to a preselected level;
   said suction conduit comprising a flow orifice so constructed to reduce flow of said liquid in said syphon means for maintaining suction through said perforate casing and said foraminous receptacle;
   said suction conduit, said discharge conduit, and said anti-syphon tubular vent, is each one branch of a unitary pipe, one end of each said suction conduit, discharge conduit and anti-syphon tubular vent having a common junction thereby permitting fluid communication among each of said branches, said flow orifice being located at said junction, said discharge conduit extending from said junction exteriorly of said settling tank, said anti-syphon tubular vent being a generally inverted U-shaped section, said U-shaped anti-syphon tubular vent section being located exteriorly of said foraminous receptacle and located above said receptacle.

2. The apparatus of claim 1, wherein the pressure differential across said mesh means is less than or equal to 5 psi.

3. The apparatus of claim 2, wherein said mesh means is a fabric having a mesh size of about 100 microns.

4. The apparatus of claim 3, wherein said mesh means is a random-weave fabric.

5. The apparatus of claim 1, wherein said mesh means is a fabric having a mesh size of about 100 microns.

6. The apparatus of claim 5, wherein said mesh means is a random-weave fabric.

7. An apparatus as recited in claim 1 wherein said foraminous receptacle is space from the side and bottom walls of said tank.

* * * * *